United States Patent [11] 3,600,633

[72] Inventor Carlo Bellis
 Strambino, Italy
[21] Appl. No. 46,785
[22] Filed June 16, 1970
[45] Patented Aug. 17, 1971
[73] Assignee Ing. C. Olivetti & C., S.p.A.
 Ivrea, Turin, Italy
[32] Priority June 21, 1969
[33] Italy
[31] 52,330-A/69

[54] SAFETY DEVICE FOR OFFICE MACHINES ACTUATED BY AN ELECTRIC MOTOR CONSISTING OF A TEMPERATURE RESPONSIVE DEFORMABLE THERMOPLASTIC GEAR
2 Claims, 1 Drawing Fig.
[52] U.S. Cl. ................................................ 317/13 R,
 310/83, 74/405
[51] Int. Cl. ...................................................... H02h 7/08,
 H02k 7/00

[50] Field of Search.......................................... 74/464,
 461, 411, 405; 192/82 T; 318/127; 310/83, 43;
 317/13, 40

[56] References Cited
UNITED STATES PATENTS
3,441,820 4/1969 Heermans ..................... 318/127
2,314,227 3/1943 Lieberherr ..................... 192/82 T
Primary Examiner—J. D. Miller
Assistant Examiner—Harvey Fendelman
Attorney—Birch, Swindler, McKie & Beckett ABSTRACT: A safety device for electric office machines comprises a reduction gear train adapted to transmit the rotation of the motor shaft to a main shaft of the machine, the gear train comprising a gear of thermoplastic material. When the motor is stalled and the rotor temperature rises, the temperature of the gear rises sufficiently rapidly to become plastic, thus allowing the motor to turn freely before real damage occurs thereto.

PATENTED AUG 17 1971
3,600,633
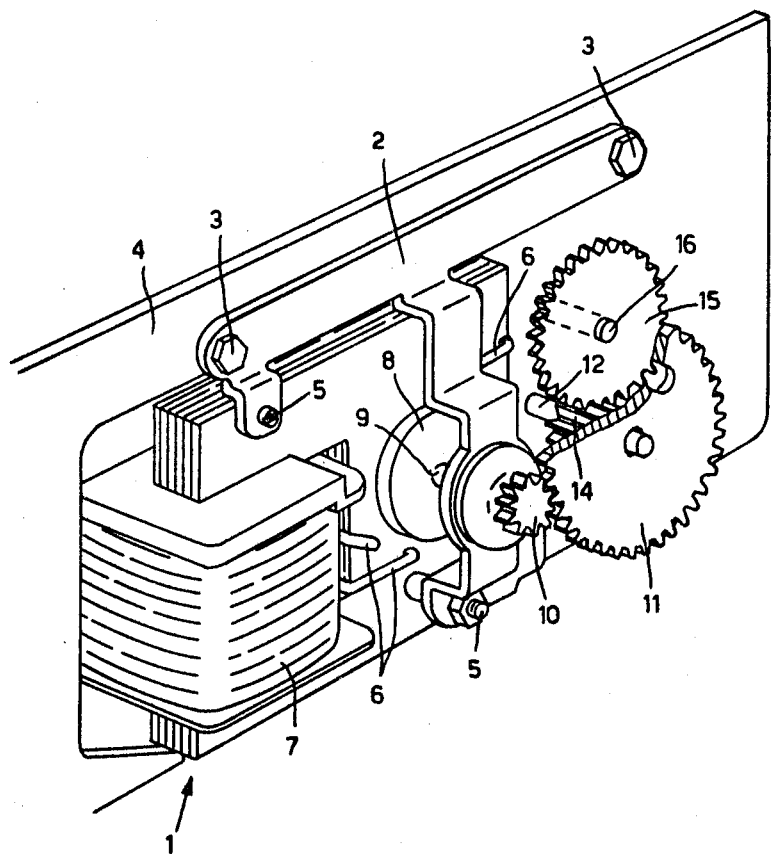
INVENTOR.
CARLO BELLIS
BY Burns, Doane,
McKee & Beckett
ATTORNEYS

3,600,633

SAFETY DEVICE FOR OFFICE MACHINES ACTUATED BY AN ELECTRIC MOTOR CONSISTING OF A TEMPERATURE RESPONSIVE DEFORMABLE THERMOPLASTIC GEAR

CROSS-REFERENCE TO RELATED APPLICATION

Applicant claims priority from corresponding Italian Pat. application No. 52330-A/69 filed June 21, 1969.

BACKGROUND OF THE INVENTION

1. Field of the Invention

The present invention relates to a safety device for typewriters, adding machines, calculators and similar office machines actuated by an electric motor, comprising a reduction gear adapted to transmit the rotation of the driving shaft to a main shaft of the machine.

2. Description of the Prior Art

In a known calculating machine actuated by an induction motor having a capacitive auxiliary phase, the safety device is constituted by a disc-type clutch interposed between the driving shaft and the main shaft of the machine. The discs of the friction clutch slip relative to one another in the event of accidental jamming of the main shaft of the machine caused, for example, by breaking or deformation of a part, thus enabling the motor to rotate without stalling. The disc-type clutch has the disadvantage of requiring constant checking of its calibration, this being considerably affected by the ambient temperature, the presence of foreign bodies between the discs and the use of the machine.

It is also important to note that replacement of the clutch unit requires the services of specialized personnel Moreover, the disc-type clutch is relatively costly, especially if fitted to simple office machines such as adding machines, and cannot be fitted to machines actuated by shaded-pole motors, which are adapted to supply at the start a torque smaller than that supplied by an induction motor of equal dimensions. In fact, in the event of a shaded-pole electric motor being stalled, it is generally not able to supply a torque sufficient to cause the discs of a friction clutch to slip, nor is it able to absorb a current which will trip an automatic switch with certainty.

Another known safety device is constituted by a maximum-current switch, which is disposed in series in the supply circuit of the electric motor for the purpose of breaking the circuit automatically in the event of consumption of a current greater than the normal current, for example owing to the arrest of the motor due to jamming of the main shaft of the machine. This device is also costly and its range of application is preferably limited to typewriters and accounting machines and not to simple adding machines. Moreover, the automatic switch has the drawback that it may also trip inappropriately in the case of sudden variations in the mains voltage.

SUMMARY OF THE INVENTION

The object of the present invention is to provide a safety device which can be used for typewriters, adding machines or calculators actuated by a shaded-pole electric motor, the cost of which is substantially lower than that of conventional induction motors. Thus the device intervenes in the event of jamming of the machine to protect the motor before the insulation of the motor winding is jeopardized, but the cost of the device can be low and the replacement thereof can be extremely simple.

According to the invention, there is provided a safety device for a typewriter, adding machine, calculator or other office machine actuated by an electric motor, comprising an electric motor, a reduction gear train adapted to transmit the rotation of the motor shaft to a main shaft of the machine, the gear train comprising a first gear of thermoplastic material in mesh with a second gear, means being provided for rendering the temperature of the second gear a direct function of the temperature of the rotor of the motor, such that, when the motor is stalled and the rotor temperature rises, the temperature of the second gear rises sufficiently rapidly to cause the teeth of the first gear to become plastic in consequence of jamming of the main shaft of the machine and allow the motor to turn freely before real damage occurs thereto.

BRIEF DESCRIPTION OF THE DRAWING

An embodiment of the invention is described hereinafter and shown in the accompanying drawing, which is perspective view, partly in section, of the device embodying the invention.

DESCRIPTION OF THE PREFERRED EMBODIMENTS

An electric motor 1 of an adding machine is fixed to the machine by means of a bracket 2 fixed by two bolts 3 to one side 4 of the frame of the machine and by two screws 5 to the motor 1. The motor 1 is normally stationary but can be set in rotation, in manner known per se, as a result of the depression of a start key of the machine which is not shown in the drawing.

The motor 1 includes a number of short-circuited turns 6 and a stator winding 7 and also a squirrel cage rotor 8 fast with a metal shaft 9 having a high thermal conductivity. At one end of the shaft 9 there is fixed a metal pinion 10. This pinion is in mesh with a toothed wheel 11 of thermoplastic material which is adapted to rotate on a spindle 12 fixed to the frame of the machine. A pinion 14 is integral with the wheel 11 and is in turn in mesh with a toothed wheel 15 fixed to a shaft 16. This shaft constitutes the main shaft of the machine and rotates in a bearing in the side frame 4.

The device operates in the following manner.

When, on completing the motor circuit, the winding 7 is energized, the rotor 8, the shaft 9 and the pinion 10 begin to turn and transmit rotation to the main shaft 16 through the wheel 11, the pinion 14 and the wheel 15. In the event of the shaft 16 being jammed accidentally, for example in consequence of the breaking or deformation of a part of the machine, all the elements 15, 14, 11 and 10 of the gear are also jammed.

The rotor 8 is also jammed, with the result that from this instant the currents induced therein causes an increase in the temperature of the rotor itself. The shaft 9 and the pinion 10 also rise in temperature if the jamming of the machine persists. If the operator does not become aware of the jamming and does not interrupt the supply to the motor 1, the temperature of the rotor 8, the shaft 9 and the pinion 10 continues to rise.

More particularly, the temperature of the pinion 10 may reach a value of about 170° C. in a time of the order of 20 to 30 seconds. In this space of time, the winding 7 which, with the rotor jammed, consumes a current a little greater than the current normally consumed, increases its temperature without, however, reaching values harmful to the insulation of the winding itself.

The temperature of 170° C. reached by the pinion 10 is sufficient to make the teeth of the wheel 11 with which the pinion is in mesh plastic, with the result that the rotor 8 can turn again, thus avoiding the winding 7 of the motor being damaged by any further increase in its temperature.

By suitably dimensioning the thickness of the wheel 11 and the pitch of its teeth and choosing a suitable material with which to form the wheel 11, it is possible to be certain of rendering the teeth of the wheel plastic at the instant when the pinion 10 reaches a fixed temperature. If the jamming of the machine lasts for less that the fixed time, the teeth of the wheel 11 do not have time to become plastic and the machine is therefore able to resume operation. On the other hand, if the teeth of the wheel 11 in mesh with the pinion 10 do become plastic, it is extremely simple to effect replacement of the wheel 11 after eliminating the cause which produced the jamming of the machine. In fact, it is sufficient to slip the wheel 11 off the spindle 12 and place a new wheel thereon.

While the invention has been disclosed with reference to a specific preferred embodiment, it will be understood that other forms might be adopted. For example, the disclosed device has obvious utility in many different electrical power systems as well as the power systems in office equipment.

What I claim is:

1. Safety device for machines actuated by an electric motor, comprising an electric motor, a reduction gear train adapted to transmit the rotation of the motor shaft to a main shaft of the machine the gear train comprising a first gear of thermoplastic material in mesh with a second gear, means being provided for rendering the temperature of the second gear a direct function of the temperature of the rotor of the motor, such that, when the motor is stalled and the rotor temperature rises, the temperature of the second gear rises sufficiently rapidly to cause the teeth of the first gear to become plastic in consequence of jamming of the main shaft of the machine and allow the motor to turn freely before real damage occurs thereto.

2. A device according to claim 1, wherein the motor shaft is a metal shaft which is fast with the rotor and with the second gear.